Patented June 8, 1954

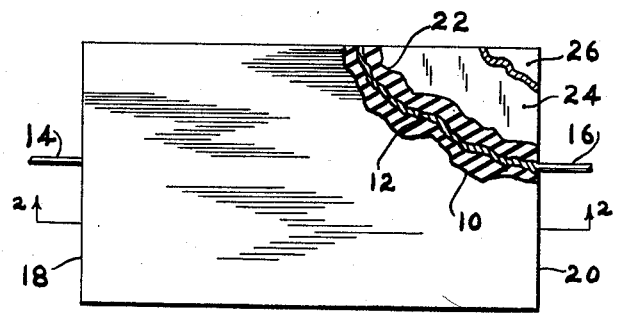
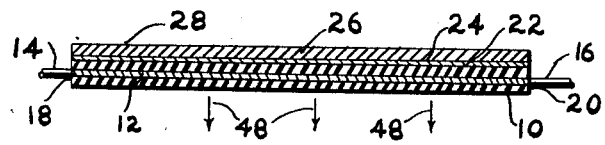
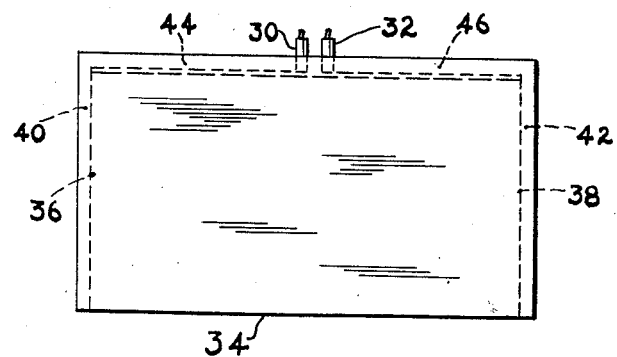

2,680,800

UNITED STATES PATENT OFFICE 2,680,800

RADIANT HEATING ELEMENT

Edward F. Chandler, New York, N. Y.

Application July 17, 1947, Serial No. 761,685

1 Claim. (Cl. 219—19)

This invention relates to heating devices, and has particular application to radiant heating devices.

An object of the invention is to provide a radiant heating device which includes a source of heat and means cooperating therewith for radiating heat from said source in a predetermined direction.

Another object of the invention is to provide a radiant heating device which includes a conductive element adapted to receive an electric current and to be heated thereby, and means cooperating therewith for radiating heat from said conductive element in a predetermined direction.

A further object of the invention is to provide a radiant heating device in sheet or strip form, and including several layers or laminations, one of said laminations having an electrically conductive element embedded therein and adapted to be heated under the influence of current from a source connected thereto, and another of said laminations being disposed adjacent to said first lamination and presenting thereto a heat reflecting surface of high relative efficiency, whereby heat generated in said first lamination is radiated from but one surface of said sheet or strip.

Still another object of the invention is to provide a radiant heating device in the form of a sheet including heat generating and heat reflecting laminations, the sheet being adapted to be installed upon the walls, ceilings, or floor of a room for heating the same, and also being adapted to be supported upon a portable screen frame, for providing localized radiant heating where needed.

Another object of the invention is to provide a unitary heat generating and reflecting device of the type described, which is simple in design, inexpensive to manufacture, and which is highly effective and efficient in operation for the purpose intended.

Other objects and advantages of the invention will become apparent from the following description of a preferred embodiment thereof, as illustrated in the accompanying drawings, and in which, Figure 1 is a face view of a radiant heating device according to my invention, the view being partly broken out to show the various layers or laminations thereof, Figure 2 is a transverse sectional view taken on line 2—2 of Figure 1, and Figure 3 is a face view similar to that of Figure 1 but not broken out, and showing a modified form of the device.

In the heating of interior rooms of buildings and dwellings, the use of radiant heating offers many advantages over the older forms of heating by means of steam or hot water radiators and the like. When radiant heating is resorted to, it is not usually necessary to raise the temperature of the radiating elements to as great a degree as is required for convection heating, since it is not desired to raise the temperature of the air in the room so much as to warm the occupants and room contents. However, despite its many advantages, radiant heating is not commonly used because of the complications of installation thereof, and the considerable cost of installation and maintenance of the heating elements, which may in some instances even involve extensive alterations of the building structure itself.

The present invention discloses means whereby radiant heating may be installed in any room, with no alterations at all. The radiant heating sheets or strips may be installed upon the walls like wall paper, or upon the ceiling or floor, it being only necessary to connect them to a source of electric current.

In order to understand clearly the nature of the invention, and the best means for carrying it out, reference may now be had to the drawings, in which like numerals denote similar parts throughout the several views.

As shown in Figures 1 and 2, I provide a radiant heating element in the form of a sheet or strip, having laminations or layers making an integral unit which may be used as needed. The unit includes an insulating matrix layer or body 10 formed of any suitable insulating material. Thus, the insulating matrix may be rubber or other similar flexible materials, or it may have a certain degree of rigidity or stiffness, in which case various plastics may be used, or such phenolic products as "Micarta," which is made of cloth or paper impregnated with phenol-formaldehyde plastics.

Embedded in the insulating matrix 10, is a heat generating element 12, which is thus firmly supported within the matrix and, if the matrix is formed of rubber or other flexible materials, will yield therewith, to assume the contour of a wall, for example, against which it is placed, or upon which it is mounted in the manner of wall paper. The heat generating element 12 may be of any form well known in the art, such as a layer of conductive metallic or carbonaceous material the resistance of which is sufficient to produce heat from the power loss therein when connected to a source of electric current, to heat the room.

The heat generating element 12 may be connected to the electric power lines in any suitable manner, as by means of the two lead wires 14 and 16, the inner ends of the wires being connected electrically to opposite end edges 18 and 20, respectively, of the heat generating element 12. The element 12 may also be formed of a number of resistance wires of Nichrome or other metals, extending back and forth through the central plane of the insulating matrix and firmly embedded therein.

It will be understood, that although the insulating matrix 10 is shown as a solid mass in sheet form, in which the heat generating wires or layer are embedded, that it may also take other forms, such as merely a heat generating element or layer placed between two insulating layers of material, somewhat in sandwich form. However, it will be found that embedding the heat generating element securely in the matrix will have numerous advantages, and this will normally warrant its employment.

Upon the outer surface 22 of the insulating matrix 10, I place a layer of metallic heat reflecting material 24, which may be metal foil made of aluminum or other suitable metal. The reflecting layer 24 may be secured to the surface 22 of the insulating matrix in any suitable and convenient manner, such as adhesively, or may be placed thereon by electro-deposition. The reflective effect and efficiency may be greatly enhanced, if that surface of the layer 24 which is abutting the matrix surface, is highly polished. The opposite surface of the layer 24 may similarly remain quite dull for low heat reflection.

A backing sheet 26, formed of any suitable material such as heavy paper or cloth, may be secured to the surface of the reflecting layer 24 which is not in contact with the insulating matrix. This backing sheet protects the metallic reflecting layer from being damaged, and has a certain degree of heat insulating effect.

The backing sheet may be secured to the metallic reflecting sheet 24 in any suitable manner, such as by means of a suitable adhesive, or the reflecting layer 24 may be placed thereon by electrodeposition. The outer surface 28 of the backing sheet 26 may, if desired, be coated with an adhesive material, which, when moistened, will adhere to a wall surface of a room or to the ceiling thereof, and this will thus be one method of disposing the radiant heating unit described herein, in a room for heating it.

If desired, the radiant heating unit may be formed of laminated phenolic material such as that known commercially as "Uskon," and produced by the U. S. Rubber Company, this unit having an integral heating layer or element disposed therein, either embedded in the laminated phenolic material, or comprising one of the laminations thereof, the heating element being connected to lead wires 30 and 32 in the manner shown in Figure 3, for connection to the electric power lines. To form a radiant heating unit according to my invention, the "Uskon" unit would have applied to one surface thereof, a metallic reflecting coating or layer similar to that shown at 24 in Figures 1 and 2, either in the form of metallic foil adhesively secured to the "Uskon" surface, or placed thereon by electrodeposition. It would be preferable, in order to protect the outer surface of the reflective layer, to place the backing sheet 26 thereover, securing it in place in any suitable manner as already described.

In the "Uskon" phenolic heating unit shown at 34 in Figure 3, contact between the lead wires 30 and 32, and the opposite vertical edges 36 and 38 of the heat generating layer is conveniently effected by means of metallic conductive vertical strips 40 and 42 which are similarly embedded in the phenolic lamination structure, extending upwards along the upper edge margin of the unit as at 44 and 46, to be connected to the inner ends of the lead wires 30 and 32 which extend partly into the laminated phenolic "Uskon" unit.

It will be seen that when the composite device shown in Figures 1 and 2, or 3, is employed, being connected to the electric power lines, heat is generated by the heat generating layer 12 in the insulating matrix 10, and that this heat is reflected by the metallic reflecting layer 24 in the direction of the arrows 48 shown in Figure 2, that is, away from the backing layer 26. This thus produces uni-directional radiation of heat, with resultant high efficiency, the heat being all directed inside the room where it is most needed, and practically none of the heat being wasted for such purposes as heating the room walls themselves.

For localized heating, a radiant heating unit as described herein may be mounted upon a relatively rigid frame, and used as a portable heat producing screen, suitable feet being provided for the frame. In this manner, the radiant heating unit may be placed near a person who is working, or near a child in a nursery, to radiate heat usefully upon such person, and it may also be moved into a bathroom and employed in the same manner, without the necessity of heating the whole room itself.

Although I have described my invention in specific terms, it is to be understood that various changes may be made in the size, shape, material and arrangement without departing from the spirit and scope of the invention as claimed.

I claim:

A radiant heating device comprising a sheet of insulating material, a heat generating element embedded in said insulating material and adapted upon connection to a source of power to generate heat in said insulating material, a relatively thin layer of material of high heat reflective characteristics secured to one surface of said insulating sheet, said heat reflective material being formed of metal which is placed upon the surface of the insulating sheet by electrodeposition, whereby unidirectional radiation of heat from said device results.

References Cited in the file of this patent

UNITED STATES PATENTS

| Number | Name | Date |
|---|---|---|
| 395,950 | Capek | Jan. 8, 1889 |
| 1,120,003 | Warner | Dec. 8, 1914 |
| 1,142,771 | Hadaway | June 8, 1915 |
| 1,521,241 | Hale | Dec. 30, 1924 |
| 2,007,610 | Musgrave et al. | July 9, 1935 |
| 2,084,468 | Wach | June 22, 1937 |
| 2,138,217 | Sutter | Nov. 29, 1938 |
| 2,165,970 | Jaspers | July 11, 1939 |
| 2,328,666 | Musgrave | Sept. 7, 1943 |

FOREIGN PATENTS

| Number | Country | Date |
|---|---|---|
| 224,648 | Great Britain | Nov. 20, 1924 |
| 238,024 | Great Britain | Aug. 13, 1925 |